United States Patent
Stone

(10) Patent No.: US 7,114,607 B2
(45) Date of Patent: Oct. 3, 2006

(54) METHOD FOR OPERATING A VERTICAL ACCUMULATING CONVEYOR SYSTEM

(75) Inventor: Frank A. Stone, Bloomfield Township, MI (US)

(73) Assignee: Die-Mation Engineering Co., Redford, MI (US)

( * ) Notice: Subject to any disclaimer, the term of this patent is extended or adjusted under 35 U.S.C. 154(b) by 0 days.

(21) Appl. No.: 10/987,971

(22) Filed: Nov. 12, 2004

(65) Prior Publication Data
US 2005/0115797 A1     Jun. 2, 2005

Related U.S. Application Data

(63) Continuation of application No. 60/518,952, filed on Nov. 11, 2003.

(51) Int. Cl.
B65G 15/00         (2006.01)
(52) U.S. Cl. .................................. 198/343.1; 198/343.2
(58) Field of Classification Search ............. 198/343.1, 198/343.2, 345.2, 345.3, 465.1
See application file for complete search history.

(56) References Cited

U.S. PATENT DOCUMENTS

| | | | | |
|---|---|---|---|---|
| 2,514,104 A | * | 7/1950 | Sutherland | 198/343.2 |
| 2,626,702 A | * | 1/1953 | Basus | 198/343.2 |
| 3,422,966 A | * | 1/1969 | Iansons | 198/343.1 |
| 4,088,220 A | * | 5/1978 | Jacksch et al. | 198/803.2 |
| 4,149,620 A | * | 4/1979 | Rosensweig | 198/345.2 |
| 6,419,071 B1 | * | 7/2002 | Oldford et al. | 198/345.3 |
| 6,568,525 B1 | | 5/2003 | Stone et al. | |

* cited by examiner

*Primary Examiner*—James R. Bidwell
(74) *Attorney, Agent, or Firm*—Young & Basile, P.C.

(57) ABSTRACT

A preferred embodiment of a method for operating a vertical accumulating conveyor system is disclosed. The method includes loading of a workpiece onto a pallet assembly of a conveyor system. The workpiece may be either loaded manually or automatically using a robotic loader or other similar apparatus. The pallet assembly carrying the workpiece is moved by the conveyor system to a workstation where the pallet is stopped to allow a manufacturing operation to be performed on the workpiece. Rather than removing the workpiece from the conveyor system in order the perform the manufacturing operation, the operation is performed with the workpiece loaded on the conveyor system. Upon completion of the manufacturing operation, the pallet assembly is released from the workstation and allowed to be transported by the conveyor system to the next workstation.

20 Claims, 3 Drawing Sheets

METHOD FOR OPERATING A VERTICAL ACCUMULATING CONVEYOR SYSTEM

RELATED APPLICATIONS

This application is a continuation of U.S. Provisional Application Ser. No. 60/518,952, filed Nov. 11, 2003.

FIELD OF THE INVENTION

The present invention relates to vertical accumulating conveyor systems, and more particularly, to a method for operating a vertical accumulating conveyor system.

BACKGROUND OF THE INVENTION

Vertical accumulating conveyor systems have been previously developed. One such conveyor system is described in U.S. Pat. No. 6,568,525, entitled Vertical Conveyor Assembly With Accumulating Pallets that issued to Stone et al. on May 27, 2003. U.S. Pat. No. 6,568,525 is hereby incorporated in its entirety. The conveyor systems includes an endless chain arranged in a horizontal configuration and engages a pair of sprockets positioned at either end of the conveyor system. The endless chain is configured to transport a plurality of pallets along a pair or guide rails. Each pallet includes a clutch sprocket assembly that enables the pallets to be stopped at dedicated stop stations or while contacting other pallets without having to stop the entire conveyor system. Thus, while the drive chain is continually driven, one or more pallets may be stopped and accumulated for loading or unloading while other pallets continue to be moved along the conveyor system.

The vertical type conveyor system is capable of carrying long or wide parts in a more upright position, which minimizes the overall footprint of the conveyor system. Because the parts are carried in an upright position, the attitude of the part never changes, and thus, no special means for holding a part on the pallets is typically required. The configuration of the vertical type conveyor system also enables parts to be continuously recirculated if not removed from the conveyor.

Vertical conveyor systems are typically employed to transport parts between workstations positioned around a perimeter of the conveyor system. In order to perform a manufacturing operation on a part, the part is first removed from the conveyor system. Upon completion of the manufacturing operation, the part is reloaded onto the conveyor system to be transported to the next workstation or to an unloading station. The process of unloading the part from the conveyor system prior to performing an operation on the part adds additional time and cost to the manufacturing process. It is thus desirable to provide a process whereby a manufacturing operation is performed on a part without having to first remove the part from the conveyor system.

SUMMARY OF THE INVENTION

In accordance with the present invention, a preferred embodiment of a method for operating a vertical accumulating conveyor system is disclosed. The method includes loading of a workpiece onto a pallet assembly of a conveyor system. The workpiece may be either loaded manually or automatically using a robotic loader or other similar apparatus. The pallet assembly carrying the workpiece is moved by the conveyor system to a workstation where the pallet is stopped to allow a manufacturing operation to be performed on the workpiece. Rather than removing the workpiece from the conveyor system in order the perform the manufacturing operation, the operation is performed with the workpiece loaded on the conveyor system. Upon completion of the manufacturing operation, the pallet assembly is released from the workstation and allowed to be transported by the conveyor system to the next workstation.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

Figure 1:
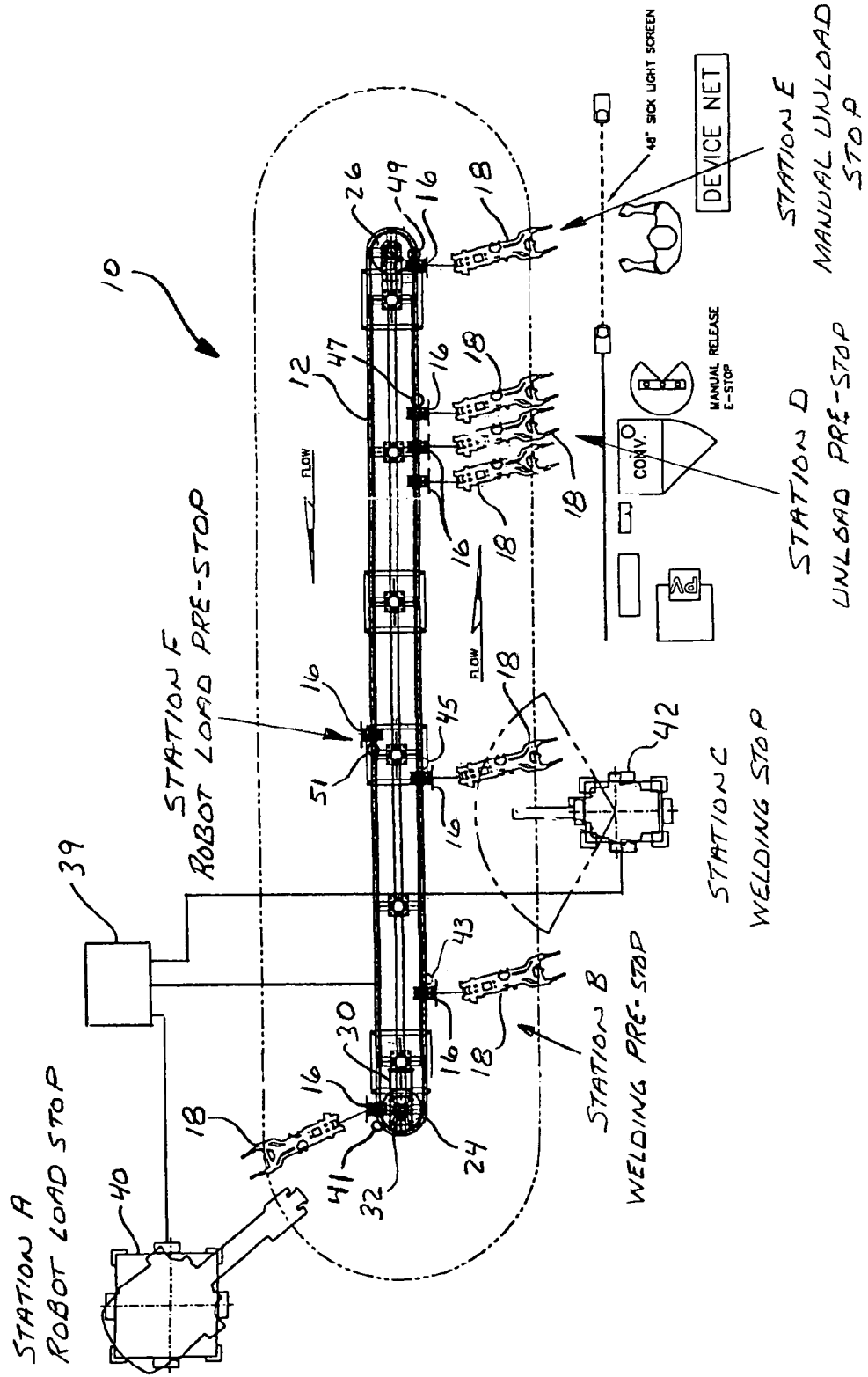
FIG. 1 is a top elevation of a vertical accumulating conveyor system employing the method of the present invention.
Figure 2:
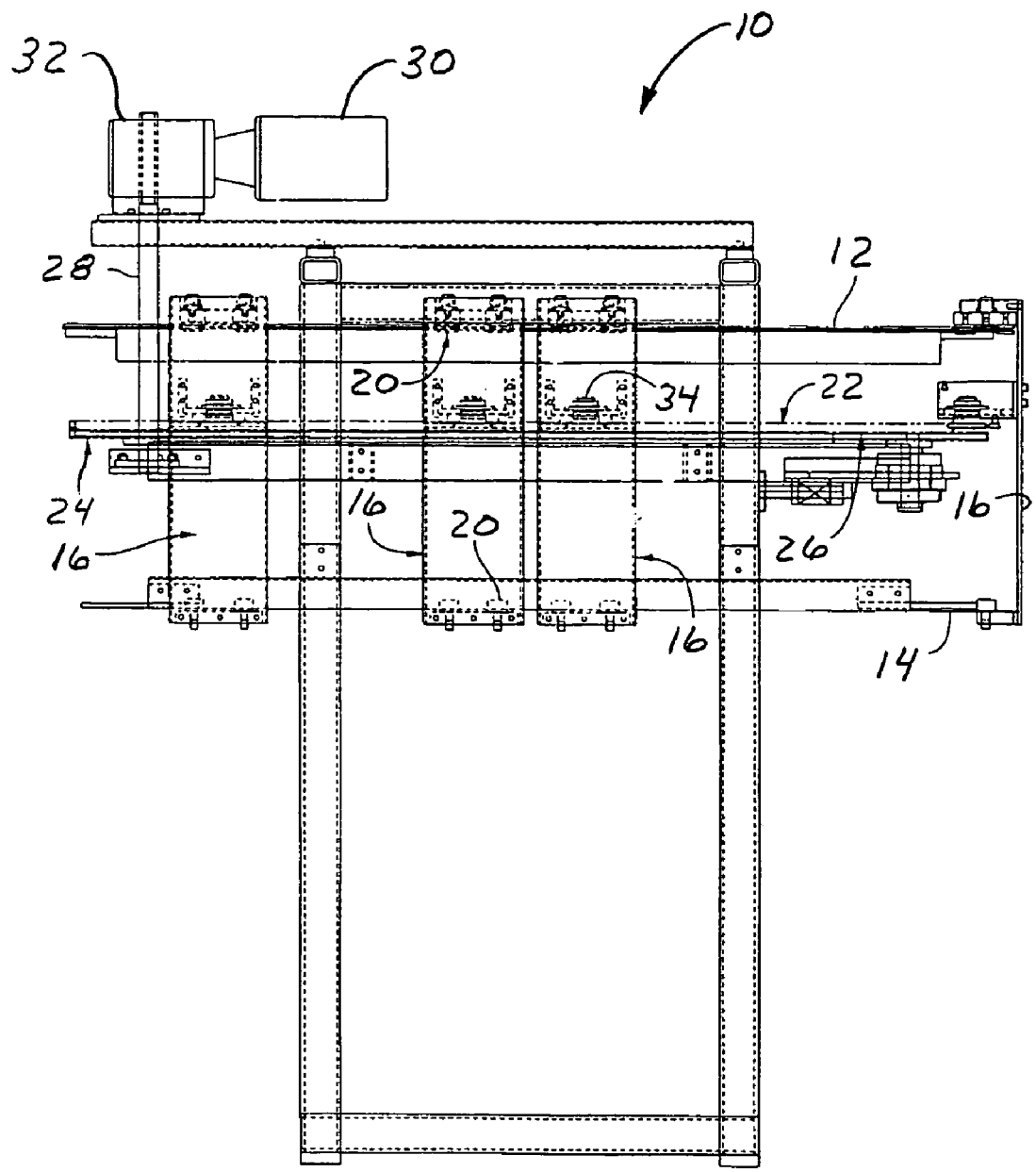
FIG. 2 is a side elevation view of the vertical accumulating conveyor system.

Referring to FIGS. 1 and 2, there is shown a vertical accumulating conveyor system 10. The conveyor system 10 includes an upper guide rail 12 and a lower guide rail 14. Each guide rail 12,14 forms an uninterrupted continuos loop with itself.

The conveyor system 10 also includes a pallet assembly 16 for supporting a workpiece 18 that can be loaded onto the conveyor system 10. The pallet assembly 16 is movably attached to the guide rails 12,14 using one or more guide rollers 20. The guide rollers 20 allow the pallet assembly 16 to be operably transported along the length of the guide rails 12,14.

One or more pallet assemblies 16 may be incorporated into the conveyor system 10 depending on the requirements of a particular application. Each pallet assembly 16 can be suitably adapted for receiving the workpiece 18. The particular arrangement of the pallet assembly 16 may depend on a variety of factors, such as the size, shape and weight of the workpiece 18 being supported. The conveyor system 10 is preferably capable of transporting differently configured parts simultaneously, and as a consequence, it is envisioned that differently configured pallet assemblies 16 may be incorporated into the conveyor system 10.

The conveyor system 10 includes a multi-strand roller chain 22 for operably moving the pallet assembly 16 along the guide rails 12,14. The roller chain 22 is engageable with a drive chain sprocket 24 positioned at one end of the conveyor system 10 and an idler chain sprocket 26 positioned at an apposite end of the conveyor system 10. The drive chain sprocket 24 includes a drive shaft 28 oriented perpendicular to the plane of the drive chain sprocket 24. An end of the drive shaft 28 is suitably connected to an electric drive motor 30 by means of a gear box 32. When energized, the electric drive motor 30 produces an output torque for operably rotating the drive chain sprocket 24.

Figure 3:
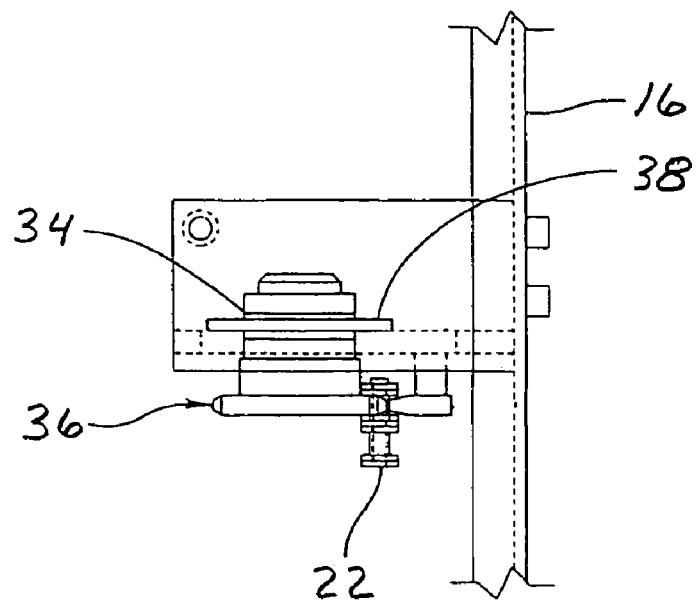
FIG. 3 is a side elevation view of a sprocket clutch assembly employed in the present invention.
Figure 4:
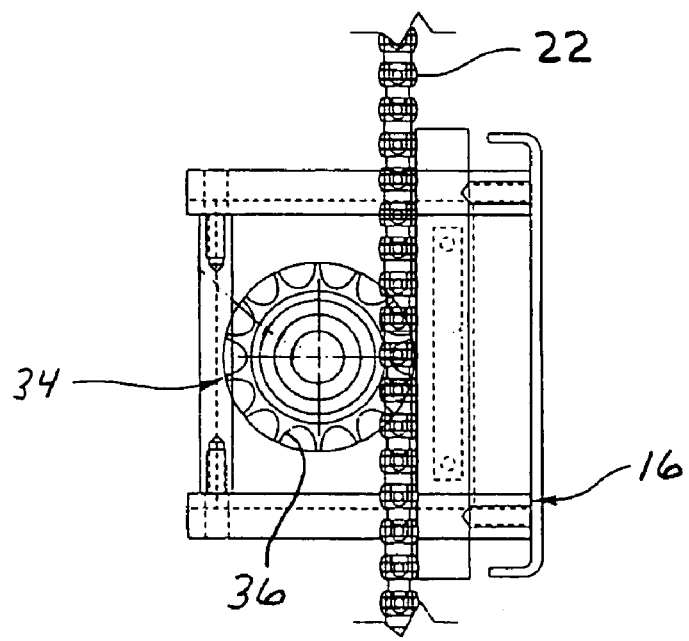
FIG. 4 is a top elevation view of the sprocket clutch assembly.

Referring also to FIGS. 3 and 4, the pallet assembly 16 includes a clutch sprocket assembly 34 for connecting the pallet assembly 16 to the roller chain 22. The clutch sprocket assembly 34 includes a clutch sprocket 36 that meshedly engages the roller chain 22. Connected to the clutch sprocket 36 is an adjustable clutch 38. The clutch 38 provides rolling resistance that allows the pallet assembly 16 to travel at the same speed as the roller chain 22. This action will continue until either a pallet stop is energized or the pallet assembly 16 encounters another stopped pallet assembly. In either case, the clutch 38 allows sufficient slippage to enable the clutch sprocket 36 to freewheel while remaining engaged with the roller chain 22. The rolling resistance of the clutch 38 is adjustable to accommodate a particular application.

The clutch sprocket assembly 34 enables one or more of the pallet assemblies 16 to be stopped anywhere along the length of the conveyor system 10 without having to stop the remainder of the pallet assemblies. This allows, for example, certain pallets to be stopped for loading and unloading of parts, while at the same time allowing other pallets to continue moving along the guide rails 12,14. A pallet assembly 16 may also be stopped to allow certain manufacturing operations to be performed on the workpiece that is being transported on the pallet assembly, such as welding and assembly of additional parts. The manufacturing operations may be performed on the workpiece while being supported by the pallet assembly without first having to remove the workpiece 18 from the conveyor system 10, which may add additional time and cost to the manufacturing process. The present invention may help minimize these losses by enabling manufacturing operations to be performed on the workpiece while still attached to the conveyor system.

The conveyor system 10 may be configured to enable the pallet assemblies 16 to be stopped at one or more work stations positioned at various locations around the perimeter of the conveyor system. For purposes of illustration, six such work stations are disclosed in FIG. 1. The work stations are separately identified as Stations A through F. It shall be understood, however, that a different number of work stations may be arranged around conveyor system 10. Various known actuators and sensors, such as solenoids, cylindicators, and proximity switches, are employed at each of the stations for controlling movement of the pallet assemblies 16 and for determining whether a workpiece having a particular configuration is present on a given pallet assembly.

Positioned adjacent to Station A is a robotic part loader 40 for automatically loading the workpiece 18 onto the pallet assembly 16. Operation of the part loader 40 and the conveyor system 10 may be synchronized by means of a known computer system 39. As the pallet assembly 16 approaches Station A, a combination stop/clamping mechanism 41 can be activated to cause the pallet assembly 16 to stop at the station. The stop/clamping mechanism 41 includes a cylindrically driven stop and an opposing cylindrically driven clamp. When activated, the stop and opposing clamp engage a catch attached to the pallet assembly 16. The stop and clamp function in unison to securely position the pallet assembly 16 relative to the robotic part loader 40.

A sensing device can be used for determining if a workpiece 18 has already been loaded onto the pallet assembly 16 stopped at Station A. If a workpiece is detected on the pallet assembly 16, the stop/clamping mechanism 41 is deactivated so as to release the pallet assembly 16 and allow it to proceed to the next station. If the workpiece 18 is not detected, a loading sequence is commenced during which the part loader 40 proceeds to load the workpiece 18 onto the pallet assembly 16. Once the workpiece is loaded, the stop/clamping mechanism 41 is deactivated and the pallet assembly 16 carrying the workpiece 18 moves along the guide rails 12,14 to the next station.

Station B serves as a staging point for controlling the flow of the pallet system 16 to Station C. Station B includes a stop mechanism 43 that can be activated to prevent the pallet assembly 16 from proceeding on to Station C. It is possible for more than one pallet assembly 16 to accumulate at Station B at any given time.

Positioned adjacent to Station C is an automated robotic welding apparatus 42. Operation of the welder 42 and the conveyor system 10 may be synchronized by means of the computer system 39. As the pallet system 16 approaches Station C, a stop/clamping mechanism 45 is activated, causing the pallet to stop at the station. The stop/clamping mechanism 45 includes a cylindrically driven stop and an opposing cylindrically driven clamp. The stop and clamp function in unison to securely position the pallet assembly 16 relative to the welder 42. If a workpiece is not detected on the pallet assembly 16, the stop/clamping mechanism is deactivated and the pallet assembly 16 is allowed to proceed to the next station.

A sensing device can be used for determining if a workpiece 18 is present on the pallet assembly 16 stopped at Station C, as well as identifying the configuration of the workpiece. If a workpiece 18 is detected and has a configuration corresponding with the welding operation to be performed at the workstation, a welding sequence is initiated during which the robotic welder 42 creates welds at predetermined locations on the workpiece 18. The welding operation is performed while the workpiece 18 remains attached the pallet assembly 16. Performing the welding operation without removing the workpiece 18 from the conveyor system 10 may reduce the time and cost associated with producing a particular part. Once the welding operation is completed, the stop/clamping mechanism 45 is deactivated and the pallet assembly 16 carrying the workpiece 18 proceeds to move along the guide rails 12,14 to the next station. Upon releasing the pallet assembly 16 from Station C, the stop mechanism 43 at Station B can be deactivated to release another pallet assembly 16 to replace the previously released pallet assembly at Station C.

After being released from station C, the pallet assembly 16 proceeds along guide rails 12, 14 to station D. As the pallet assembly 16 approaches Station D, a stop mechanism 47 can be activated for stopping the pallet assembly at the station. Station D functions as a staging area for controlling the flow of the pallet assemblies 16 to Station E, where the workpiece 18 can be unloaded from the pallet assembly 16. It is possible for more than one pallet assembly 16 to accumulate at station D at a given time.

At Station E the workpiece 18 can be unloaded from the pallet assembly 16. Station E includes a stop mechanism 49, which when activated stops the pallet assembly 16 at a location adjacent the station. The unloading operation may be performed manually or automatically using a robotic unloader or a similar apparatus. The stop mechanism 47 at Station D is preferably operated in such a manner that only one pallet assembly 16 is present at Station E at any given time. After the workpiece 18 is unloaded from the pallet assembly 16, the stop mechanism 49 at Station E is deactivated to release the pallet assembly and allow it to proceed along rails 12,14 to Station F. Upon releasing the pallet assembly 16 from Station E, the stop mechanism 47 at Station D is deactivated just long enough to allow one pallet assembly 16 to proceed to Station E to replace the pallet assembly just released.

Station F functions as a staging area for Station A. Pallet assemblies released from Station E can accumulate at Station F. Station F includes a stop mechanism 51 that is operable to prevent the pallet assembly 16 from proceeding on to Station A. The stop mechanism 51 is preferably controlled in manner that allows only one pallet assembly 16 to be present at Station A at any given time. Upon releasing a pallet assembly from Station A, the stop mechanism at Station F can be deactivated just long enough to allow one pallet assembly 16 to proceed from Station F to Station A.

While various aspects of the present invention have been disclosed, it will be appreciated that many other variations may be incorporated without departing from the scope of the present invention. For example, other automated devices may be used in place of, or in addition to, the automated robotic welder, such as inspecting and assembly apparatus. Likewise, if desired, the workpiece may be manually loaded onto the conveyor system rather than using a robotic loader. It is also envisioned that the conveyor system may include any number of stations depending on the particular requirements of the manufacturing process in which the conveyor system is incorporated. Furthermore, if necessary, appropriate clamping mechanisms may be incorporated into the pallet systems for securing the workpiece to the pallet system. The description of the invention is merely exemplary in nature and, thus, variations that do not depart from the gist of the invention are intended to be within the scope of the invention. Such variations are not be regarded as a departure from the spirit and scope of the invention.

What is claimed is:

1. A method for processing a workpiece using a vertical conveyor system having a pallet assembly for receiving the workpiece, comprising the steps of:
   loading the workpiece onto the pallet assembly;
   transporting the pallet assembly and the workpiece along the conveyor system to a workstation positioned adjacent the vertical conveyor system;
   stopping the pallet assembly at a predetermined location along a path of travel of the pallet assembly adjacent the workstation, wherein the pallet assembly and workpiece cease being transported along the conveyor system;
   performing a predetermined procedure on the workpiece while the workpiece is loaded on the pallet assembly without removing the pallet assembly from the conveyor systems and
   releasing the pallet assembly from its location adjacent the workstation and allowing the pallet assembly and workpiece to resume being transported along the conveyor system.

2. The method of claim 1, wherein the step of loading the workpiece onto the pallet assembly comprises the steps of:
   transporting the pallet assembly along the conveyor system to a loading station;
   stopping the pallet assembly at a predetermined location along the path of travel of the pallet assembly adjacent the loading station; and
   determining if another workpiece has already been loaded onto the pallet assembly stopped adjacent the loading station prior to loading the workpiece onto the pallet assembly.

3. The method of claim 2 further comprising the step of releasing the pallet assembly from its stopped location adjacent the loading station when it is determined that another workpiece is already loaded onto the pallet assembly.

4. The method of claim 2 further comprising the step of loading the workpiece onto the pallet assembly stopped adjacent the loading station when it is determined that another workpiece is not already loaded onto the pallet assembly.

5. The method of claim 2, wherein the step of determining if the workpiece has been loaded onto the pallet assembly stopped adjacent the loading station comprises using a detector to scan for the presence of the workpiece.

6. The method of claim 1, wherein the step of stopping the pallet assembly at a predetermined location along a path of travel of the pallet assembly adjacent the workstation comprises simultaneously actuating a stop member and an opposing clamp member and engaging the stop member and clamp member with a catch attached to the pallet assembly.

7. The method of claim 1, wherein the step of transporting the pallet assembly and workpiece along the conveyor system comprises the steps of engaging a clutch sprocket with a chain for operably moving the pallet assembly along a perimeter of the conveyor system.

8. The method of claim 1, wherein the step of releasing the pallet assembly from its location adjacent the workstation comprises the step of disengaging a stop member and an opposing clamp member from a catch attached to the pallet assembly, thereby enabling die pallet assembly to travel at the same speed as a chain used to operably move the pallet assembly along the conveyor system.

9. A method for processing a workpiece attached to a pallet of a vertical conveyor system, comprising the steps of:
   transporting the pallet and the workpiece along the conveyor system to a workstation positioned adjacent the vertical conveyor system;
   stopping the pallet at a predetermined location along a path of travel of the pallet adjacent the workstation, wherein the pallet and workpiece cease being transported along the conveyor system;
   determining a configuration of the workpiece;
   performing a predetermined procedure on the workpiece attached to the pallet without removing the pallet from the conveyor system, when it is determined the configuration of the workpiece corresponds with the procedure to be performed; and
   releasing the pallet from its location adjacent the workstation and allowing the pallet assembly and workpiece to resume being transported along the conveyor system.

10. The method of claim 9 further comprising the step of releasing the pallet from its location adjacent the workstation and allowing the pallet and workpiece to resume being transported along the conveyor system when it is determined the configuration of the workpiece does not correspond with the procedure being performed at the workstation.

11. The method of claim 9, wherein the step of stopping the pallet at a predetermined location along a pat of travel of the pallet adjacent the workstation comprises simultaneously actuating a stop member and an opposing clamp member and engaging the stop member and clamp member with a catch attached to the pallet assembly.

12. The method of claim 9, wherein the step of releasing the pallet from its location adjacent the workstation comprises the step of disengaging a stop member and an opposing clamp member from a catch attached to the pallet to enable the pallet to travel at the same speed as a chain used to operably move the pallet along the conveyor system.

13. A method for processing a work piece attached to a pallet of a vertical conveyor system, comprising the steps of:
    transporting the pallet assembly and the workpiece along the conveyor system to a workstation located adjacent to the conveyor system;
    stopping the pallet assembly at a predetermined location adjacent the workstation; and
    performing a procedure on the workpiece while the pallet is stopped at the workstation, wherein the pallet assembly remains attached to the conveyor system and the workpiece remains affixed to the pallet assembly throughout each of the steps.

14. The method of claim 13 further comprising the step of affixing the workpiece to the pallet assembly at a loading station prior to the step of transporting the pallet assembly and the workpiece to the workstation, wherein a level of contact between the workpiece and the pallet assembly remains substantially constant between the step of affixing the workpiece to the pallet assembly and the step of performing a procedure on the workpiece while the pallet is stopped at the workstation.

15. The method of claim 13 further comprising the steps of:
    releasing the pallet assembly from its location adjacent the workstation;
    transporting the pallet assembly and workpiece along the conveyor system to an unloading station;
    stopping the pallet assembly at the unloading station; and
    removing the workpiece from the pallet assembly, wherein the workpiece remains affixed to the pallet at each step between being affixed to the pallet assembly at the loading station and being removed from the pallet assembly at the unloading station.

16. The method of claim 13, wherein the level of contact between the workpiece and the pallet assembly remains substantially constant throughout each of the steps.

17. The method of claim 13 further comprising the steps of:
    stopping the pallet assembly at a pie-staging station prior to transporting the pallet assembly to the work station; and
    releasing the pallet assembly from the pie-staging station and transporting the pallet assembly along the conveyor system to the work station.

18. The method claim 17 further comprising the steps of:
    determining if a pallet assembly is stopped at the workstation; and
    releasing the pallet assembly from the pre-staging station when it is determined that another pallet assembly is not present at the workstation.

19. The method of claim 17, wherein the step of stopping the pallet assembly at the pie-staging station comprises stopping consecutive pallet assemblies at the pie-staging station so as to cause multiple pallet assemblies to accumulate at the pre-staging station.

20. The method of claim 17, wherein the work piece remains affixed to the pallet assembly while the pallet assembly is stopped at the pit-staging station.

* * * * *